United States Patent [19]
Fujita et al.

[11] Patent Number: 5,035,598
[45] Date of Patent: Jul. 30, 1991

[54] OPTIMUM MOLDING CONDITION SETTING SYSTEM FOR INJECTION MOLDING MACHINES

[75] Inventors: Shigeru Fujita; Hideo Saito; Katsuyuki Yamamoto; Satoshi Endo; Fumio Kamahora, all of Shizuoka, Japan

[73] Assignee: Toshiba Machine Co., Ltd., Tokyo, Japan

[21] Appl. No.: 433,048

[22] Filed: Nov. 7, 1989

[30] Foreign Application Priority Data

Nov. 9, 1988 [JP] Japan .............................. 63-283084

[51] Int. Cl.$^5$ .............................................. B29C 45/77
[52] U.S. Cl. .................................. 425/144; 264/40.3; 264/40.7; 425/135; 425/149
[58] Field of Search .................... 425/135, 141–150; 264/40.3, 40.4, 40.7

[56] References Cited

U.S. PATENT DOCUMENTS

| | | | |
|---|---|---|---|
| 4,695,237 | 9/1987 | Inaba | 425/144 |
| 4,696,632 | 9/1987 | Inaba | 425/150 |
| 4,740,148 | 4/1988 | Fuita et al. | 425/149 |
| 4,911,629 | 3/1990 | Fujita | 425/149 |
| 4,9802,834 | 2/1989 | Neko | 425/149 |

Primary Examiner—Timothy Heitbrink
Attorney, Agent, or Firm—Young & Thompson

[57] ABSTRACT

An optimum molding condition setting system for an injection molding machine comprises a molten material flow analysis component for analyzing resin flow, resin cooling and the structure/stength of molded products by using a designed mold model and also comprises an analysis result evaluation component for determining an initial molding condition and its permissible range in accordance with the analysis results. The initial molding condition is set into the injection molding machine and a test shot is carried out in order to check for a deficiency of a molded product. If a deficiency of the molded product is detected, a data of the deficiency is entered into a molding defect elimination component. After performing a convenient data processing based on the entered data, a cause of the molding defect can be inferred and a measure for the cause can be obtained with high efficiency and accuracy. Consequently, the molding condition can properly and immediately be corrected in accordance with data obtained by the molten material flow analysis component.

8 Claims, 5 Drawing Sheets

FIG. 2

Table 1. Cause to be inferred : Shortage of resin fluidity

| Remarks \ Possibility | 3 | 3 | 3 | 2 | | |
|---|---|---|---|---|---|---|
| Appearing position: | | | | | | |
|     Flow end | O | O | | | | |
|     Flow midway | | | | | | |
| Configuration of defective part: | | | | | | |
|     Thick part | | | O | O | | |
|     Medium thickpart | O | | | | | |
|     Thin part | | | | | | |
|     Narrow branch | | | | | | |
|     Protrusion end | | O | | | | |
| Average thickness: | | | | | | |
|     Thick | | | | | | |
|     Medium | O | O | O | | | |
|     Thin | | | | | | |
| Reduced flow area: | | | | | | |
|     Yes | | | | | | |
|     No | O | O | | | | |
| Short shot: | O | O | | | | |
| Sink mark: | | | O | O | | |
| Appearing position: | | | | | | |
|   Remote from a gate | | | O | | | |
|   Near a gate | | | | O | | |
| TR1 OUT Holding-pressure process | O | O | O | | | |
| Cushion amount 1-LS4 | O | O | O | | | |

Measures:

1) Forwardly move a holding-pressure changing position.
2) Expand a high speed range.
   Increase a filling pressure (Pi) if a filling time is constant.
3) Heat up a barrel of a heating cylinder.
4) Heat up a mold.

FIG. 3

Table 2. List of causes to be inferred (Possibility: high--low : 5--1

| Cause \ Defect | Shortage of holding pressure | Shortage of resin fluidity | Defective purge | Shortage of weighing | Large resistance of resin flow | Large shrinkage | Appearing Position |
|---|---|---|---|---|---|---|---|
| Short Shot 1 | 4 | 3 | 1 | 1 | 1 | | End of resin flow part with medium thickness |
| Sink Mark 1 | 2 | 3 | | | | 2 | End of filling operation, underside of boss/rib |
| Sink Mark 2 | 3 | 2 | | | | 2 | Beginning of filling operation, underside of boss/rib |

FIG. 4

Table 3. List of measures for eliminating causes

| Defect<br>Measure Information | | Short Shot 1 | Sink Mark 1 | Sink Mark 2 |
|---|---|---|---|---|
| Cause | Measure | | | |
| Shortage of holding pressure | PH↑ | 4 | 2 | 3 |
| | TRH↑ | 4 | 2 | 3 |
| Shortage of resin fluidity | LS4↓ | 3 | 3 | 2 |
| | Vi-h↑ | 3 | 3 | 2 |
| | H1↑ | 3 | 3 | 2 |
| | HM↑ | 3 | 3 | 2 |
| Defective purge | Vi4↓ | 1 | | |
| Shortage of weighing | LS5↑ | 1 | | |

1~5 : Effects being expected.
    (Large value represents large expected effect.)
0 : Effects are not expected at the present condition/ other defects may occur.
-1 : Correction value exceeds a permissible range/other defects may occur.

PH↑ : Increase holding pressure PH1,2,3.
TRH↑ : Increase holding pressure time TR1.
LS4↓ : Move forwardly a holding
Vi-h↑ : Expand an injection
H1↑ : Heat up a barrel H1.
HM↑ : Heat up a mold.

Vi4↓ : Reduce an injection Vi4.

LS5↑ : Increase a weighing.

OPTIMUM MOLDING CONDITION SETTING SYSTEM FOR INJECTION MOLDING MACHINES

FIELD OF THE INVENTION

This invention relates to an optimum molding condition setting system for an injection molding machine which is capable of efficiently and accurately setting an optimum molding condition into the injection molding machine in order to obtain a predetermined quality of molded products upon molding a molten material such as resin and the like.

BACKGROUND OF THE INVENTION

Conventionally, in case of molding a molten material such as resin and the like, a molding engineer has set an optimum molding condition by repeating a trial and error molding technique based on his previous experiences. For this reason, such a setting of the optimum molding conditions depends considerably on the engineer's ability, so that it is necessary to train the engineers to be skillful.

There has also been proposed such an engineer-supporting system that the optimum molding condition is theoretically obtained by analyzing a resin flow under a predetermined molding condition in a model mold which is designed on a computer and by evaluating the molding condition.

In case of carrying out an analysis of a resin flow to evaluate a molding condition in the system used for theoretically obtaining the optimum molding condition by such a model mold, it is essential to use knowledge based on previous experiences of an engineer skilled in a molding technique. There has been a problem how to introduce the engineer's knowledge into such a system and the problem has not yet been solved.

SUMMARY OF THE INVENTION

In order to solve the problem, this invention aims to provide the optimum molding condition setting system for the injection molding machine such that the skillful engineer's know-how is built-in as an intelligent data base which is introduced into a computer. By means of the system, even an unskilled engineer can easily set the optimum molding condition as well as the skillful engineer does.

In accordance with the present invention, as shown in FIG. 1, there is provided the optimum molding condition setting system for the injection molding machine comprising:

- means for analyzing a flow of a molten material (12), which carries out analyses of resin flow, resin cooling and the structure/strength of a molded product by using a mold model designed on a computer;
- means for evaluating an analysis result (14), which determines an initial molding condition to be actually set in an injection molding machine (10) on the basis of the analysis result obtained by the molten material flow analysis means (12) and provides a permissible range of a molding condition and data of an average thickness and a thin or thick part of the molded product;
- means for eliminating a molding defect (16), which infers causes of a molding defect in accordance with a relation between a deficiency of the molded product and a condition of a resin, mold, etc., stores both the first intelligent data base for inferring the causes of the molding defect and the second intelligent data base for evaluating measures to be taken, and calculates a correction value of the molding condition after selecting the effective measures corresponding to the causes to be inferred by entering the data of the deficiency of the molded product, wherein the first intelligent data base includes measures prepared with a priority and the second intelligent data base is capable of converting the respective measures to an amount of each operating factor of the molding condition while inferring the measures for the inferred causes of the molding defect; and
- a man-machine user interface (18) for entering the data of defective molded products into the molding defect elimination means (16) while entering the molding condition set by the analysis result evaluation means (14) into the injection molding machine (10), resetting the correction value of the molding condition in the injection molding machine (10) after evaluating the obtained correction value of the molding condition by the analysis result evaluation means (14), and repeating the correction and the reset until obtaining an optimum molding condition.

In the optimum molding condition setting system, when entering the data of the defective molded products into the molding defect elimination means, a defective point is entered into a filling pattern diagram being obtained by the molten material flow analysis means. As a result, the deficiency which occurs during a filling control process of the injection molding machine can be ascertained.

In the optimum molding condition setting system, the analysis result evaluation means compares the correction values of the molding conditions such as a mold temperature, a resin temperature, an injection speed, a cool time, etc. being obtained by the molding defect elimination means, with permissible values being obtained by the molten material flow analysis means. An alarm message can be issued and/or the value of the molding condition can be corrected again when the correction value of the molding condition exceeds the permissible value.

Data of a configuration of the mold model which are employed for the analysis by the molten material flow analysis means can be used by the molding defect elimination means.

Furthermore, the corrected value of the molding condition being obtained by the molding defect elimination means can be analyzed by the molten material flow analysis means, evaluated by the analysis result evaluation means and then set in the injection molding machine.

This system may preferably be connected to the injection molding machine via a communication line so as to automate both a transfer of data regarding the molding defect and a setting of the molding condition.

In addition, the system may be provided with an IC card capable of writing the molding condition and/or an operating state of the injection molding machine so that various data can be interchanged between the system and the injection molding machine.

According to the present invention, there is provided an optimum molding condition setting system for an injection molding machine comprising the molten material flow analysis means for analyzing resin flow, resin cooling and the structure/strength of molded products by using the designed mold model. The system also comprises the analysis result evaluation means for determining an initial molding condition and its permissible range in accordance with the analysis result. The initial molding condition is set into the injection molding machine and a test shot is carried out in order to check for a deficiency of the molded product. If the deficiency of the molded product is detected the data of the deficiency is entered into the molding defect elimination means. After performing a convenient data processing based on the entered, data, a cause of the molding defect can be inferred and a solution to the cause can be obtained with high efficiency and accuracy. Consequently, the molding condition can properly and immediately be corrected in accordance with data obtained by the molten material flow analysis means.

Described below in depth by referring to attached drawings are some of the example embodiments of the optimum molding condition setting system for injection molding machines under this invention.

BRIEF DESCRIPTION OF THE DRAWINGS

FIG. 2 is a format diagram showing an intelligent data base for determining causes of a molding defect which is used in the system of the invention;

FIG. 3 is a format diagram showing a list of causes to be inferred which is used in the system of the invention;

FIG. 4 is a list of solutions which is used in the system of the invention; and

PREFERRED EMBODIMENTS OF THE INVENTION

Figure 1:
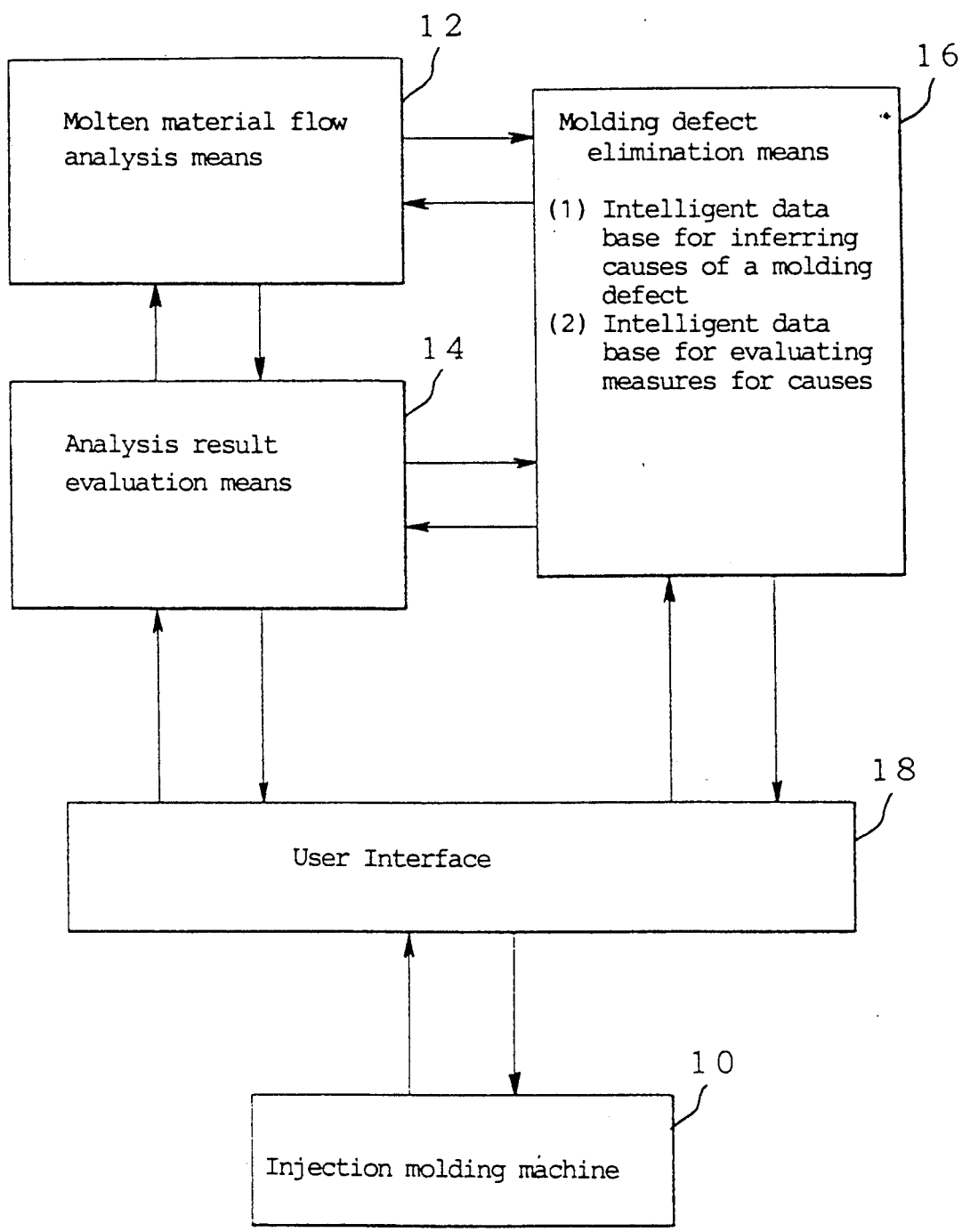
FIG. 1 is a block diagram illustrating an optimum molding condition setting system for an injection molding machine according to a preferred embodiment of the present invention.

FIG. 1 shows a system for setting an optimum molding condition for an injection molding machine according to an embodiment of the invention. The system shown in FIG. 1 is constituted such that the optimum molding condition and a control program thereunder can be prepared for and entered into a control unit of the injection molding machine (10). Therefore, the system includes a molten material flow analysis means 12, an analysis result evaluation means 14, a molding defect elimination means 16 and a user interface 18. These components are connected to the injection molding machine 10 via the user interface 18, resulting in a man-machine system.

The respective means will be described in more detail hereinafter.

A. Molten material flow analysis means

The molten material flow analysis means 12 first designs a mold model. When designing the mold model, configuration data such as, for example, a projection area, thickness, a gate shape and runner shape of the mold and the like are determined. Subsequently, in accordance with the configuration data of the mold model, a function of distributions of a resin temperature and resin pressure relative to all the elements of the mold model is obtained by using as a variable a filling time or a mold temperature while a filling pattern diagram is designed.

In the filling pattern diagram, an elapsed time relative to a resin flow in the mold is represented by a parameter so as to identify that part of the molded product which is produced during the filling process of the mold. Therefore, it is possible to analyze a defective part in a filling control process in the injection molding machine when entering the data of the deficiency of the molded product into the filling pattern diagram.

A function showing a characteristic of a molten resin temperature is obtained from an arithmetic operation result of the distribution of the resin temperature at the end of a filling operation. Maximum and minimum resin temperatures (T) in all the elements of the model mold are represented by the functions having as a variable the filling time (t), respectively (T-t graph). As a result, it is possible to determine a permissible range of the filling time in which the maximum resin temperature is stable to a variation of the filling time and the minimum resin temperature is sufficiently higher than a solidification temperature (it is changable depending on the resin and mold to be employed).

A function showing a characteristic of the maximum resin pressure is obtained from an arithmetic operation result of the distribution of the resin pressure at the end of a filling operation relative to the obtained molten resin temperature. The maximum resin pressure (P) in all the elements of the mold model is represented by a function having both the filling time (t) as a variable and the resin temperature as a parameter at the start of the filling operation (P-t graph). Therefore, it is possible to determine a permissible range of the filling time which meets requirements according to a specification of the molding machine and in which the maximum resin pressure is stable to a variation of the filling time.

Further, as a result of an arithmetic operation of the distribution of the resin pressure at the end of a filling operation, the maximum resin pressure (P) in all the elements of the model mold is represented by a function having both a mold temperature (Tm) as a variable and the resin temperature as a parameter at the start of the filling operation (P-Tm graph). Therefore, it is possible to determine a permissible range of the mold temperature in which the maximum resin pressure is stable to a variation of the mold temperature.

On the basis of the analysis results described hereinbefore, an analysis of a resin flow in the designed model mold is carried out to set a molding condition and a thickness, gate, runner, etc. of the mold. Subsequently, an analysis of a resin cooling is carried out to set a cool time and then an analysis of a structure/strength of a molded product is carried out to check for the structure and strength thereof and possibility of occurrence of a sink mark. If any problem is found out from the analysis results, these analysis are carried out again under other suitable conditions.

B. Analysis result evaluation means

An analysis result evaluation means 14 evaluates a thickness, gate, runner, etc. of the mold and the molding condition which are set in accordance with the analysis results being obtained by the molten material flow analysis means 12. The evaluation means also determines the cool time and evaluates the structure, strength, etc. of the molded product so as to make an initial molding condition to be actually set in the injection molding machine 10. In addition, the evaluation means builds data relative to an average thickness, a thin and thick part, etc. of the molded product while determining a permissible range of the molding condition. The initial molding condition determined in such a way is set in the injection molding machine 10 so that a test shot is carried out.

C. Molding defect elimination means

A molding defect elimination means 16 stores the first intelligent data base for inferring causes of a molding defect. The first intelligent data base includes measures enumerated with a priority as well as the causes of the molding defect being inferred in accordance with a relation between a deficiency of a molded product and a condition of a resin and mold, etc. Accordingly, this intelligent data base can be set as shown in Table 1 of FIG. 2. By using such an intelligent data base to infer the causes of the molding defect, a list of causes to be inferred is built in order to make an inference of the causes on the basis of actual data such as the deficiency of the molded product, the molding condition, an operating state of the injection molding machine (an amount of a cushion which is the resin remaining at the tip of a screw, an operation of the screw, etc.) and the like (refer to Table 2 of FIG. 3). In this case, since there exists a plurality of the causes for one defect, namely occurrence of one defect is not limited to only one cause, a plurality of the causes may be usually inferred. Therefore, a plurality of the inferred causes leads to a built-up of a list including a plurality of measures to be taken to eliminate the inferred causes (refer to Table 3 of FIG. 4). Generally, any measure for one defect is not always effective to other defects and may occasionally accelerate the defective state. For this reason, a degree of an effect of the measure as well as the defect which may be caused by selecting the measure are enumerated in the respective lists.

In addition to the first intelligent database in which the measures for elimination of the defect and the effects thereof are inferred, the molding defect elimination means also stores the second intelligent data base which is capable of evaluating the measures and converting the respective measures to an actual amount of operating conditions or parameters of the injection molding machine. The priority of the measures for the molding defects is determined based on both the list of causes to be inferred and the list of measures to be taken.

The second intelligent data base is applied to the measure having the highest priority as determined above so that a correction value of the molding condition can be obtained. By using this correction value, the molding condition is altered. The corrected molding condition is checked to ensure it does not exceed a permissible range determined by the analysis result evaluation means 14. If it exceeds the permissible range, the measure having the second priority is selected and the above mentioned operations are repeated. Thus, the properly corrected molding condition is determined and set in the injection molding machine 10. The test shot is carried out again, so that it is realized to decrease or eliminate the defect of the molded product.

D. User interface

A user interface 18 is provided such that the system according to the present invention can be effectively operated in order to smoothly perform the specified control operations of the respective means 12, 14 and 16 by connecting these means to the injection molding machine 10 to be installed by a user.

Figure 5:
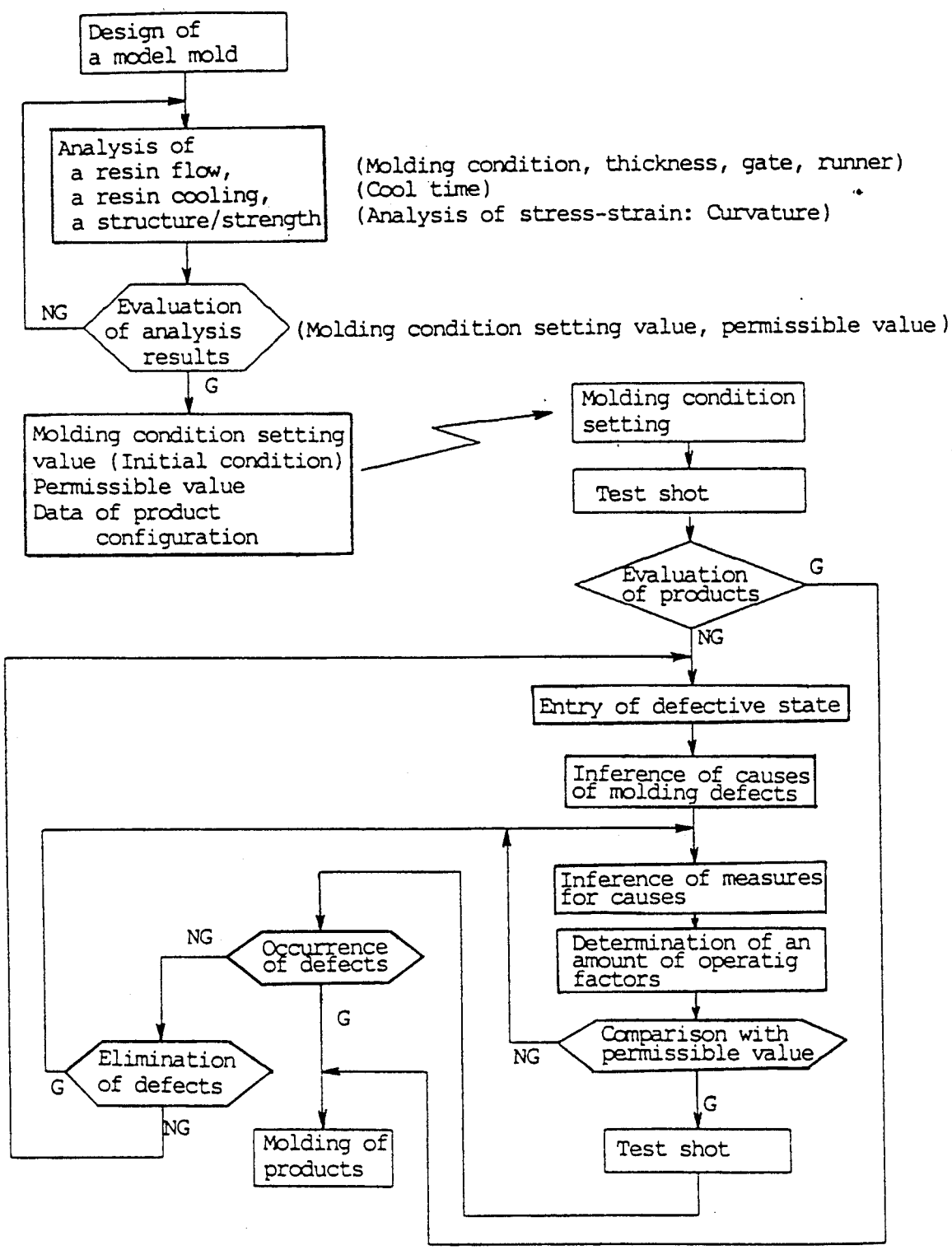
FIG. 5 is a flow chart illustrating a control program by which the system of the invention is performed.

FIG. 5 is a flow chart showing a control program according to an embodiment of the invention for setting an optimum molding condition for the injection molding machine comprising a system shown in FIG. 1. Then, setting procedures of the optimum molding condition according to the system of the present invention are described hereinafter with reference to FIG. 5.

At first, the molten material flow analysis means 12 designs a model mold and successively carries out the above mentioned analyses of a resin flow, a resin cooling and a structure/strength of the model. The obtained results of these analyses are evaluated by the analysis result evaluation means 14 so that the initial molding condition and its permissible range are determined. The molding condition being determined is set in the injection molding machine 10 through the user interface 18. In this case, there are provided the following ways to set the molding condition in the injection molding machine 10:

(1) setting by means of an operator's manual operation
(2) automatic setting by means of a communication line
(3) setting by means of an IC card Subsequently, the test shot is carried out under the molding condition being set. The operator evaluates the molded product which is obtained after the test shot. When the molded product includes any deficiency, a name and data of the deficiency are entered into the molding defect elimination means 16. For entering the data into the molding defect elimination means 16, there are provided the following ways as described above:

(1) input by means of an operator's manual operation
(2) automatic input by means of a communication line
(3) input by means of an IC card If a complete product is molded in the test shot process, the continuous manufacturing of the product can be immediately started without changing the molding condition. On the other hand, when evaluating the defect of the molded product, for example, a defective portion is indicated in a filling pattern diagram being obtained by the molten material flow analysis means 12. In accordance with the data of the indicated portion, the analysis result evaluation means 14 judges a defective portion which occurs during a filling process (the end or the midway of a resin flow, and if in the midway thereof, step No. among all the steps of a filling speed) and enters the result of the judgment into the molding defect elimination means 16.

Further, the molding defect elimination means 16 infers causes of the defect by using the first intelligent data base for inferring causes of the molding defect, in accordance with actual data such as the entered defective state, the molding condition (an evaluation, judgment, etc. by the analysis result evaluation means 14), an operating state of the injection molding machine (an amount of a cushion, an operation of the screw, etc.) and the like. For example, when the molding defect is a short shot which occurs at the molded product portion with an even thickness and at the end of the resin flow without formation of reduced area in the midway of the resin flow, and has a cushion amount ranging from 1 mm to LS4 (a holding-pressure changing position) and a holding pressure upon TRI OUT (completion of injection time), it is inferred that the molding defect is caused by a fluidity of the resin and is evaluated as the rating 3 (three) for the possibility (refer to FIG. 2). Thus, the list of causes to be inferred is built as shown in FIG. 3. Since there is a plurality of the causes for one defect, a plurality of the causes may be usually inferred. Therefore, by using both of the first and second intelligent data bases for inferring causes of the molding defect and for evaluating measures corresponding to the cause to be inferred, a list of measures is built as shown in FIG. 4. In this case, a certain measure selected for one defect is not necessarily effective for other defects and may occasionally accelerate the defective state. For this reason, a degree of an effect of the measure as well as the defect which may occur by selecting the measure should be described in both the lists of causes to be inferred and measures to be taken. For example, numerical values in Table 3 of FIG. 4 represent the effects of measures upon the elimination of the molding defects. The larger value represents that the more excellent effect is expected. Based on the degree of the effect, the value "0" is set when no effect is expected and the value "—" is set when a defect may occur.

As apparent from the above, the measure with the highest priority is selected, and the correction value of the molding condition is calculated by using the second intelligent data base for evaluating measures. To this end, the correction value is checked to ensure it does not exceed a permissible range being determined by the molten material flow analysis means 12 and the analysis result evaluation means 14. If it exceeds the permissible range, the measure having the second priority is selected to correct the molding condition again. If it does not exceed that range, the correction value of the molding condition is entered into the injection molding machine 10 with the correction to carry out the test shot. If a complete product is molded in the test shot process, the continuous manufacturing of the product can be immediately started without changing the molding condition.

Otherwise, if in the test shot a molding defect is detected or another defect is newly detected despite elimination of the previous defect, another measure is selected by referring to the list of measures. Then, in the list of measures of FIG. 4, the marks "X" and "O" are put at a portion where the defect has occurred and a portion where no effect has occurred, respectively. On the other hand, when the defect is not eliminated at all, the data for inferring the causes are re-entered into the molding defect elimination means 16. Thus, the corrective operation of the molding condition described above is repeated so that it is realized to set the molding condition for complete products.

As apparent from the hereinbefore described embodiments, according to the present invention, the test shot is carried out under the initial molding condition being obtained by the molten material flow analysis means so as to infer the causes of the defect of the molded product and take its appropriate measures. As a result, an accurate correction of the molding condition is executed, so that a setting of the proper molding condition for complete products can be achieved easily and in a short time.

Moreover, the permissible range of the molding condition is obtained from the analysis executed by the molten material flow analysis means and thereby the molding condition is capable of being corrected within a proper range. Accordingly it is possible to eliminate an unnecessary and useless test shot.

In addition, it is possible to properly ascertain a position where the deficiency occurs during a filling process when entering that position into a filling pattern diagram which is obtained by using the molten material flow analysis means. As a result, it is also possible to infer the causes of the molding defect and determine the measures for the causes with the highest efficiency and accuracy.

Although the present invention has been described hereinbefore with its preferred embodiments, it will be appreciated that many variations and modifications may be made without departing from the spirit and scope of the invention.

What is claimed is:

1. Apparatus for setting optimum molding conditions in an injection molding machine, comprising:
    means for analyzing a flow of molten material within a model mold, said analyzing means assessing cooling of said resin flow and structural strength of a molded product resulting from said flow within said model mold;
    means for evaluating results produced by said analyzing means, said evaluating means determining an initial molding condition to be set in an injection molding machine based on said results from said analyzing means, said evaluating means further providing an operating range of a molding condition as well as data indicative of an average thickness of a predetermined part of the molded product;
    means for eliminating a molding defect comprising a first intelligent data base for inferring causes of an input molding defect in accordance with a relation between the molding defect and a mold or resin condition, and a second intelligent data base for calculating a correction value to be entered in the injection molding machine, said correction value being based on the causes of the molding defect inferred by the first intelligent data base, said first intelligent data base including prioritized corrective measures corresponding to a range of possible molding defects to be input into the defect eliminating means, and said second intelligent data base being adapted to convert said corrective measures to said correction value; and
    interface means for receiving data indicative of defects in molded products produced in the injection molding machine, and transmitting said data to the defect eliminating means and to the evaluation means, said interface means also receiving the initial molding condition from the evaluating means and transmitting the initial molding condition to the injection molding machine;
    said evaluating means resetting the initial molding condition in accordance with the correction value received from said defect eliminating means, and said interface means receiving a reset correction value from the evaluating means and transmitting the reset correction value to the injection molding machine.

2. Apparatus according to claim 1, wherein the analyzing means generates a filling pattern diagram based on the resin flow within the model mold, and wherein data of a defective point in a molded product received from the interface means is entered into the filling pattern diagram for analyzing a defect occurring during filling of the injection molding machine.

3. Apparatus according to claim 1, wherein said evaluating means is adapted to generate an alarm message when the correction value generated by the defect eliminating means is outside the operating range generated by the evaluating means.

4. Apparatus according to claim 1, wherein the evaluating means is adapted to alter the correction value generated by the eliminating means, when the correction value generated by the eliminating means is outside the operating range generated by the evaluating means.

5. Apparatus according to claim 1, wherein data representative of a configuration of the model mold in the analyzing means are also employed by said defect eliminating means to infer causes of a defect in a molded product.

6. Apparatus according to claim 1, wherein the correction value generated by the defect eliminating means is used by the analyzing means to re-analyze the resin flow within the model mold.

7. Apparatus according to claim 1, wherein the interface means comprises a communication cable allowing automatic data transfer between the defect eliminating means, the evaluating means, and the injection molding machine.

8. Apparatus according to claim 1, wherein the interface means comprises an IC card for writing a molding condition generated by the evaluating means, as well as for writing an operating state of the injection molding machine.

* * * * *